(12) United States Patent
Busch-Sorensen et al.

(10) Patent No.: US 9,824,508 B2
(45) Date of Patent: Nov. 21, 2017

(54) TRANSIT VEHICLE SENSOR SYSTEM

(71) Applicant: Cubic Corporation, San Diego, CA (US)

(72) Inventors: Thomas Busch-Sorensen, San Diego, CA (US); Rasheed Behrooznia, San Diego, CA (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 15/264,795

(22) Filed: Sep. 14, 2016

(65) Prior Publication Data

US 2017/0076511 A1    Mar. 16, 2017

Related U.S. Application Data

(60) Provisional application No. 62/218,969, filed on Sep. 15, 2015.

(51) Int. Cl.
| | |
|---|---|
| *G07C 5/00* | (2006.01) |
| *G06F 17/22* | (2006.01) |
| *G07C 5/08* | (2006.01) |
| *H04L 29/02* | (2006.01) |
| *H04L 29/08* | (2006.01) |
| *G06Q 50/30* | (2012.01) |

(52) U.S. Cl.
CPC ......... *G07C 5/008* (2013.01); *G06F 17/2247* (2013.01); *G06Q 50/30* (2013.01); *G07C 5/08* (2013.01); *G07C 5/0808* (2013.01); *G07C 5/0816* (2013.01); *H04L 29/02* (2013.01); *H04L 67/26* (2013.01); *H04L 67/02* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 6,611,739 B1 | 8/2003 | Harvey et al. | |
| 8,996,234 B1 * | 3/2015 | Tamari | G07C 5/0808 |
| | | | 701/123 |

(Continued)

FOREIGN PATENT DOCUMENTS

KR    101513084 B1 *    4/2015

OTHER PUBLICATIONS

Choi et al., KR 101513084 (IP.com translation Mar. 18, 2017).*

(Continued)

*Primary Examiner* — Fadey Jabr
*Assistant Examiner* — Kevin P Mahne
(74) *Attorney, Agent, or Firm* — Kilpatrick, Townsend & Stockton, LLP

(57) ABSTRACT

The present invention is generally related to monitoring and remotely accessing the environmental and operating parameters on a vehicle such as a bus, train, subway, taxi, ride share, airplane, ferry, hyper loop, or other transit vehicle, although applications are not so limited. Embodiments of the present invention including mounting sensors, that communicate data over a network, on the inside and externally to vehicles such that the sensor data can be: monitored and viewed remotely; monitored or viewed by transit patrons using the vehicle; and monitored and viewed by the driver on a driver control unit.

20 Claims, 12 Drawing Sheets

(56) References Cited

U.S. PATENT DOCUMENTS

| | | | |
|---|---|---|---|
| 2003/0137435 A1* | 7/2003 | Haddad | G08G 1/133 |
| | | | 340/994 |
| 2006/0161315 A1* | 7/2006 | Lewis | G08G 1/20 |
| | | | 701/1 |
| 2010/0174576 A1 | 7/2010 | Naylor | |
| 2011/0112717 A1 | 5/2011 | Resner | |
| 2013/0274950 A1* | 10/2013 | Richardson | G08G 1/0112 |
| | | | 701/1 |
| 2014/0226010 A1 | 8/2014 | Molin et al. | |
| 2014/0309877 A1* | 10/2014 | Ricci | H04W 48/04 |
| | | | 701/36 |
| 2015/0081362 A1* | 3/2015 | Chadwick | G06Q 50/30 |
| | | | 705/7.14 |
| 2015/0120132 A1 | 4/2015 | Kramer et al. | |
| 2017/0024936 A1* | 1/2017 | Pinkus | G06Q 10/06 |

OTHER PUBLICATIONS

International Search Report and Written Opinion dated Dec. 8, 2016 for International Patent Application No. PCT/US2016/051828, filed Sep. 15, 2016; all pages.

\* cited by examiner

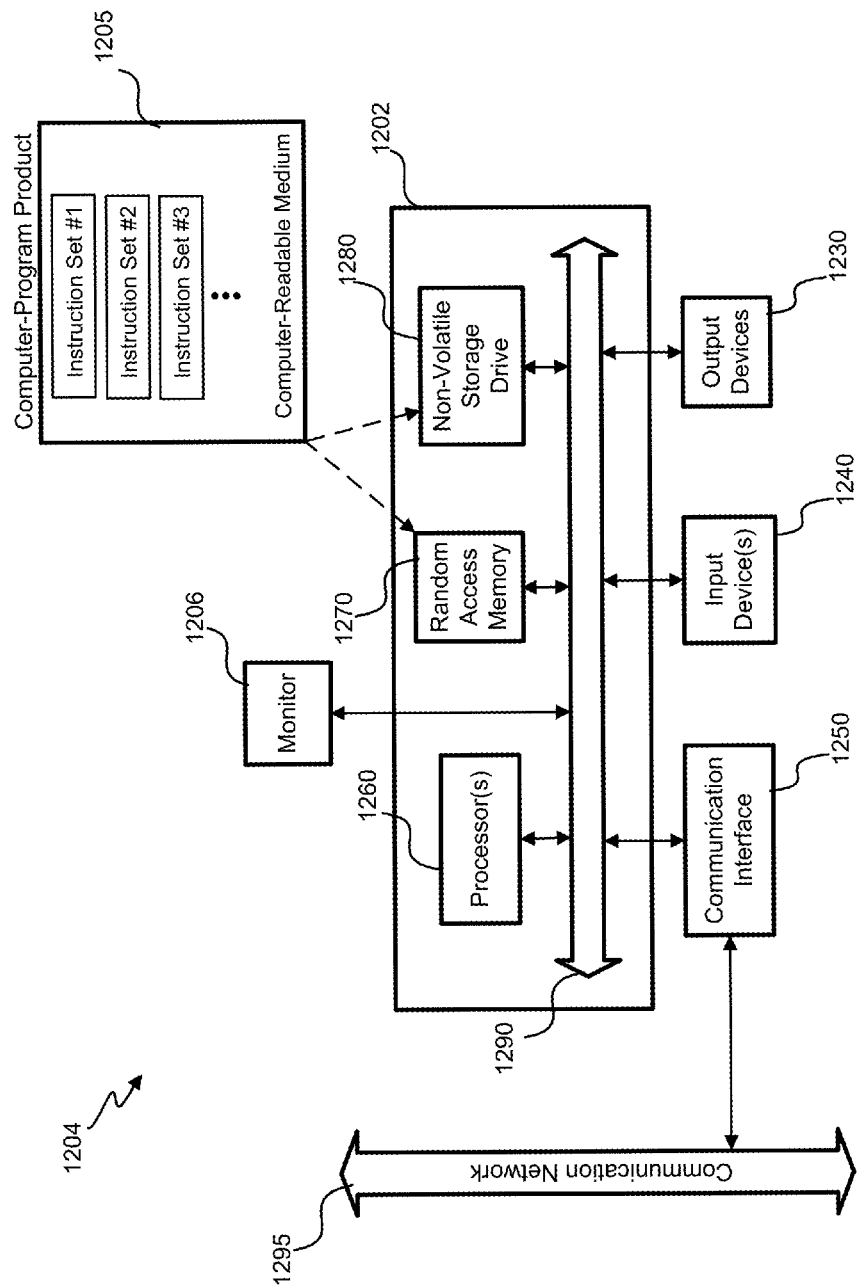

TRANSIT VEHICLE SENSOR SYSTEM

CROSS-REFERENCE TO RELATED APPLICATIONS

This application is a nonprovisional of and claims the benefit of priority to U.S. Provisional Patent Application No. 62/218,969, filed Sep. 15, 2015, entitled "DATA COLLECTION SYSTEM," the entire content of which is herein incorporated by reference in its entirety.

BACKGROUND OF THE INVENTION

Vehicle computers traditionally measure a number of engine and environment parameters that are displayed on or near the dashboard. Typically this information is only assessable to the driver or persons within sight of the dashboard. Furthermore, potential passengers on the vehicle do not have access and cannot determine the comfort level of the vehicle. Transit authorities typically don't have access to the measured external environmental parameters of the roadway and maintenance staff and vehicle operators cannot assess vehicle mechanical integrity or monitor how safely the driver drives the vehicle in real time either. The current invention is generally related to monitoring and remotely accessing the environment and operating parameters on a vehicle such as a bus, train, subway, taxi, ride share, airplane, ferry, hyper loop, or other transit vehicle, although applications are not so limited.

BRIEF SUMMARY OF THE INVENTION

One embodiment of the present invention is a method of data collection from sensors on a vehicle, wherein the vehicle is a transit vehicle. The method comprises receiving by a central system wherein the central system is geographically separated from the vehicle: a request for a presentation of status data, wherein the status data is related to one or more characteristics of the vehicle, from a user device, wherein the user device is geographically separated from the central system; first data, from a first sensor connected to the vehicle; and second data, from a second sensor connected to the vehicle. The method also comprises storing the first data and the second data at a central store, wherein the central store is located remotely from the vehicle. The method further comprise a central system: in response to the request for a presentation of status data, retrieving, first data and second data from the central store; transforming the first data and the second data into status data; generating a web page, wherein the web page presents status data; and sending, by the central system, an alert to the user device indicating that the status data is available. Variations of this embodiment comprise: the first sensor mounted inside the vehicle; the first sensor mounted externally on the vehicle; a data collection unit wherein the first sensor is enclosed in the data collection unit and the central system receives first sensor data from the data collection unit; the first sensor senses temperature, humidity, noise, vibration, acceleration, and/or odor; the first sensor senses tire, oil, fluid, pneumatic, and/or hydraulic pressure; and the first sensor senses one or more road conditions.

In yet another embodiment of the present invention is a vehicle, wherein the vehicle is a transit vehicle, sensor data collection device comprising: a central system, wherein the central system is geographically separated from the vehicle, configured to receive: a request for a presentation of status data, wherein the status data is related to one or more characteristics of the vehicle, from a user device, wherein the user device is geographically separated from the central system; first data, from a first sensor connected to the vehicle; and second data, from a second sensor connected to the vehicle. The method further comprises a central store configured to store the first data and the second data, wherein the central store is geographically separated from the vehicle. The method also comprises the central system, in response to the request, configured to: transform the first data and the second data into status data; generate a web page, wherein the web page presents status data; and send an alert to the user device indicating the status data is available. This embodiment also has variations that comprise: the first sensor mounted inside the vehicle; the first sensor mounted externally on the vehicle; a data collection unit wherein the first sensor is enclosed in the data collection unit and the central system receives first sensor data from the data collection unit; the first sensor senses temperature, humidity, noise, vibration, acceleration, and/or odor; the first sensor senses tire, oil, fluid, pneumatic, and/or hydraulic pressure; and the first sensor senses one or more road conditions.

In yet a further embodiment is a non-transitory computer readable medium having instructions embedded thereon for collecting vehicle sensor data, wherein the vehicle is a transit vehicle, the instructions including computer code for receiving by a central system wherein the central system is geographically separated from the vehicle: a request for a presentation of status data, wherein the status data is related to one or more characteristics of the vehicle, from a user device, wherein the user device is geographically separated from the central system; first data, from a first sensor connected to the vehicle; and second data, from a second sensor connected to the vehicle. This embodiment further comprises storing the first data and the second data at a central store, wherein the central store is located remotely from the vehicle. This embodiment also comprises a central system, in response to the request for a presentation of status data: retrieving, first data and second data from the central store; transforming the first data and the second data into status data; generating a web page wherein the web page presents status data; and sending an alert to the user device indicating that the status data is available. This embodiment has further variations that comprise: the first sensor mounted inside the vehicle; the first sensor mounted externally on the vehicle; a data collection unit wherein the first sensor is enclosed in the data collection unit and the central system receives first sensor data from the data collection unit; the first sensor senses temperature, humidity, noise, vibration, acceleration, and/or odor; the first sensor senses tire, oil, fluid, pneumatic, and/or hydraulic pressure; and the first sensor senses one or more road conditions.

BRIEF DESCRIPTION OF THE DRAWINGS

The present disclosure is described in conjunction with the appended figures:

FIG. 12 depicts a block diagram of an embodiment of a special-purpose computer system.

Figure 1:
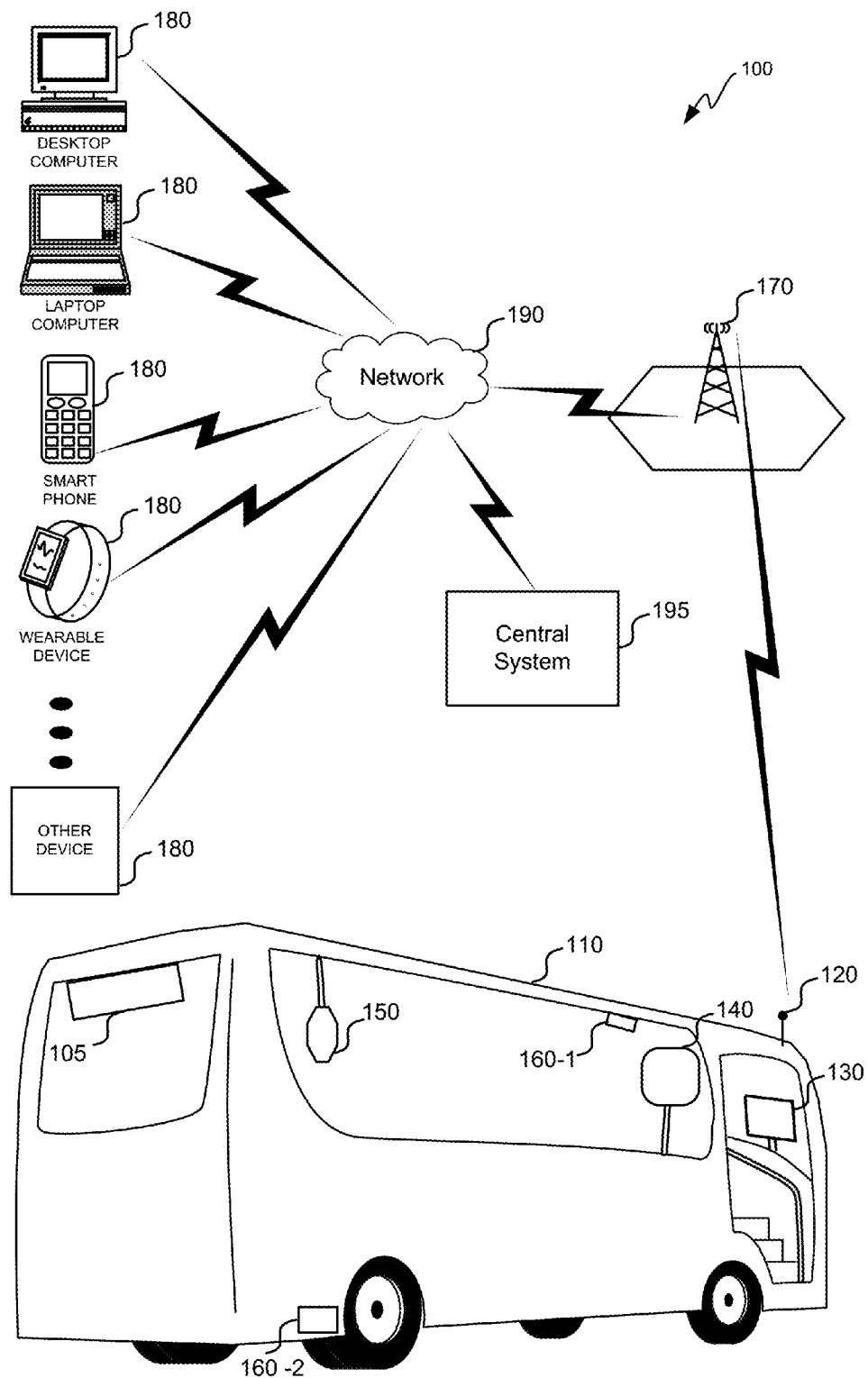
FIG. 1 is an illustrative view of a transit vehicle sensor system.

In the appended figures, similar components and/or features may have the same reference label. Where the reference label is used in the specification, the description is applicable to any one of the similar components having the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

In the following description, for the purposes of explanation, numerous specific details are set forth in order to provide a thorough understanding of various embodiments. It will be apparent, however, to one skilled in the art that various embodiments may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosed systems and methods as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

The present invention is generally related to monitoring and remotely accessing the environmental and operating parameters on a vehicle such as a bus, train, subway, taxi, ride share, airplane, ferry, hyper loop, or other transit vehicle, although applications are not so limited. Embodiments of the present invention including mounting sensors, that communicate data over a network, on the inside and externally to vehicles such that the sensor data can be: monitored and viewed remotely; monitored or viewed by transit patrons using the vehicle; and monitored and viewed by the driver on a driver control unit. For instance, potential and current passengers can determine from environment parameters such as the temperature of the vehicle to take another vehicle, route, or form of transportation. Additionally, transit authorities and vehicle operators can monitor vehicle speed to determine safety factors such as if a driver is driving safely. And operators can monitor such things as tire pressure to proactively prevent flat tires or blowouts. Embodiments of the present invention can use modern sensor technology such as microelectromechanical systems (MEMS) to measure a multitude of physical parameters. The data can be accessed remotely and processing such as machine learning can extract data by applying specific algorithms or comparing with trends or historical data.

For example, in some embodiments, the sensor data collection can typically take place on a moving vehicle and the data is typically accessed through a radio modem. The system can be designed so that anybody can access the data, for example the patrons in a transit system can watch the data on a web page, or the data can be made available to only a limited audience, such as maintenance staff or a vehicle operator. The system can also compare recent sensor data with historical or average sensor data to detect trends such as deterioration in performance.

In some embodiments, the transit vehicle sensor system can include a self-contained sensor unit with sensors contained within it, or it can have internally and externally-mounted sensors connected with wires or operating on battery power that communicates through a short range radio frequency (RF) link such as BLUETOOTH or BLUETOOTH Low Energy (BLE). In other embodiments the transit vehicle sensor system can comprise both a self-contained sensor unit and internally and externally mounted sensors.

The transit vehicle sensor system can use a communication link to send data to a central server and/or it can act as a web page and let the user choose what data should be displayed. The data could also be logged to a storage device such as a memory card (e.g. OD card) and/or the like, in place of the communication link and/or as a back-up solution in case the communication link is not available. The storage could be a circular buffer with frequent time-stamps so an event can be examined later on.

In some embodiments, the system can have its own communication link or it can be connected to an existing communication system on the bus (or other vehicle) and use a common communication link for connection to the central system. A bus will typically have a distributed serial link such as RS485, controller area network bus, or Ethernet between on-board devices.

Embodiments may include one or more of the following advantages. First the invention will allow passengers and/or other users to remotely monitor the operation of a vehicle. Second, if transit patrons are able to access the data, they can follow the state of the vehicles and the temperature, and other environmental characteristics, and even choose a bus route or a particular bus based on the data. Third, transit authorities and vehicle operators can access the parameters of the vehicle and the performance of the driver remotely. Fourth, others can access the conditions external to the vehicle such as wet roads, pot holes, dangerous chemicals, etc. However, it will be understood by a person of ordinary skill in the art that embodiments may implement one or more inventive aspects described herein using alternative components and/or materials. Furthermore, embodiments may combine, separate, add, omit, or otherwise alter the components shown, depending on desired functionality. Additionally, embodiments may further include machine-readable media having instructions embedded thereon for causing one or more devices to perform one or more functions described herein. A bus is used throughout this application as one embodiment, but one of skill in the art will understand that the system could be implemented on any vehicle such as a car, subway, train, boat, airplane, space shuttle, hyper loop, ferry, hovercraft, or any other vehicle.

With reference now to FIG. 1, a simplified illustration of one embodiment of a transit vehicle sensor system 100, a bus 110 is shown with other components of the transit vehicle sensor system 100. Inside the bus 110 is an on-board data collector 105. The on-board data collector 105 aggregates data from all of the sensors on bus 110 and is described in more detail in FIG. 2. Attached to bus 110 is an antenna 120. Antenna 120 can communicate with a cellular, WiFi, or other communications network. As depicted, antenna 120 is in communication with cellular network 170. Inside the bus 110 is depicted a fare collection system 130. Fare collection system 130 can collect fare from any number of fare media including magnetic strip detection, near field communication devices, cash, etc. Also inside bus 110 is driver control unit 140. The driver control unit 140 displays the information collected by on-board data collector 105. The driver control unit 140 can also display any other type of information useful or necessary to the driver. Also inside the bus 110 is a data collection unit 150. Data collection unit 150 is further described in FIG. 4.

Figure 6:
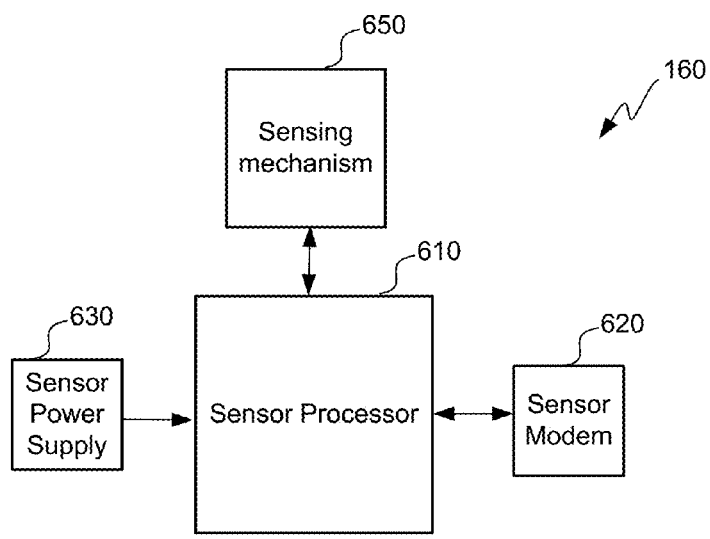
FIG. 6 is a block diagram of one embodiment of a sensor.

A first sensor 160-1 is located inside the bus 110. A second sensor 160-2 is located externally on the bus 11. One of skill in the art will understand that there can be multiple sensors located inside of and externally on bus 110. Sensors 160 can be any one or more of the following: Accelerometer, Gyroscope, Vibration, Magnetic compass, GPS, Temperature, Bus Voltage, Pressure, Humidity, Light, UV light, Pyroelectric Detector, Sound pressure (with or without spectral analysis), airspeed, ultrasonic Doppler, CO2, and/or CO sensors and other chemical sensors (H2S, organic solvents, . . . ), and/or smoke detectors. One of skill in the art will recognize that other embodiments could comprise any other type of sensor not listed here, but otherwise appropriate for sensing any parameter. Sensor 160 is further described in FIG. 6.

External to the bus 110 is cellular network 170. Cellular network 170 connects the on-board data collector 105 to the network 190. Once connected to network 190, on-board data collector 105 can communicate with a central system 195. Central system 195 is further described in FIG. 7. Central system 195 facilitates user device 180 access to the sensor 160 data collected by on-board data collector 105. The user device 180 may be communicatively coupled with the central system 195. Such a user device 180 may be a smart phone or other mobile phone (including a near-field-communication enabled mobile phone), a tablet personal computer (PC), a personal digital assistant (PDA), an e-book reader, wearable device or other device. In transit vehicle sensor system 100, a communicative link from user device 180 to central system 195 can be provided by network 190. User device 180 can thereby communicate with the central system 195 to access and/or manage information with their user account. Furthermore, the central system 195 can send messages to the user device 180, providing bus comfort levels, schedule information, and/or other information to a user of the transit vehicle sensor system 100 in possession of the user device 180. Such messages may be based on, among other things, current bus environmental levels, chances in schedules or arrival times, delays for certain routes, and/or other user preferences as stored in a user account. In some embodiments, the network 190 can comprise any type of communications including Bluetooth, local area network, intranet, wired internet, wireless internet, mobile communication network including, for example, cellular network, radio network, and/or the like.

A user can use the user device 180 to download a data collection application from a central system 195. According to some embodiments, the data collection application can provide additional functionality to the user device 180, including enabling a near field communication (NFC)-enabled user device to be used as fare media on bus 110. The data collection application can also allow the user to view environmental conditions via sensors 160 on bus 110. A user can decide based on viewing sensor data to ride bus 110 or pick another bus route. For instance, if the sensor 160 senses a 94 degree temperature on the bus 110, the user may pick another bus 110, pick another route, or choose a different form of transportation altogether.

Figure 2:
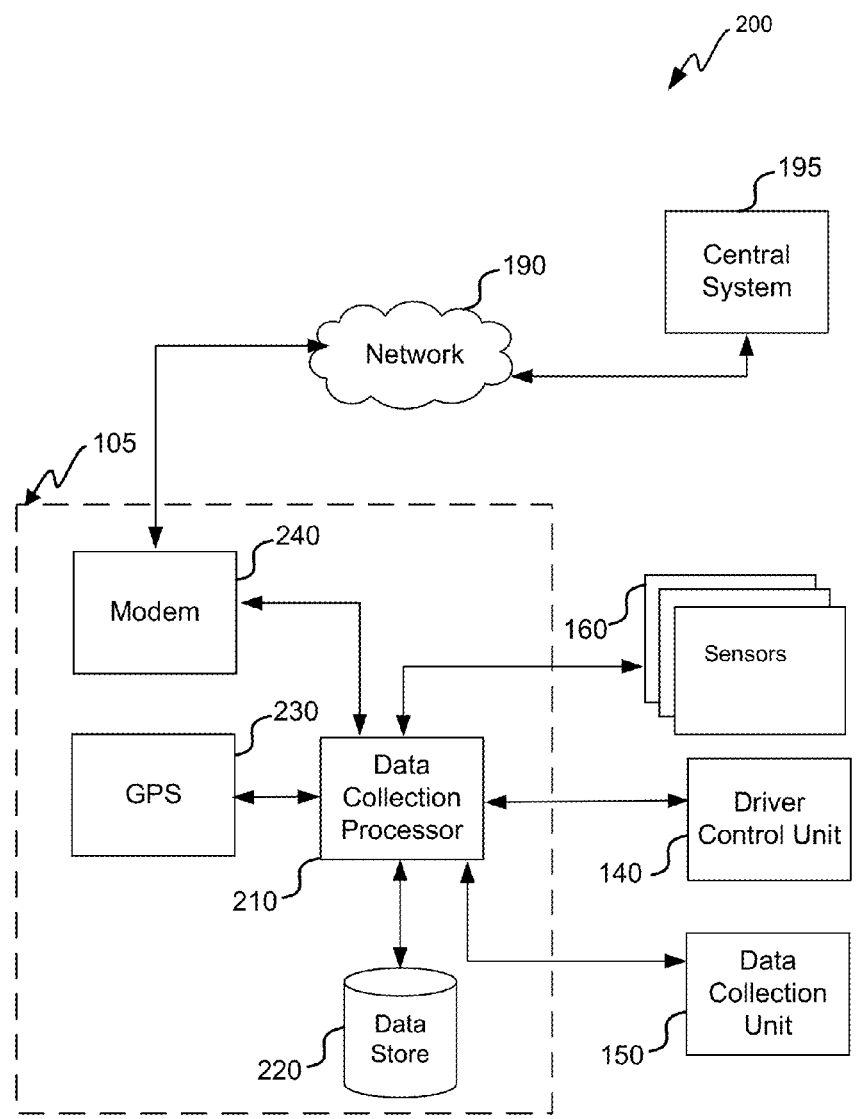
FIG. 2 is an illustrative view of one embodiment of an on-board data collector.

Turning now to FIG. 2, a block diagram 200 of one embodiment of on board data collector 105 in communication over network 190 with central system 195 and in communication with sensors 160, data collection unit 150 and driver control unit 140. At the heart of the on-board data collector 105 is a data collection processor 210. The data collection processor 210 is in communication with and receives sensor 160 data from the data collection unit 150. The data collection processor 210 is in communication with sensors 160. The data collection processor 210 processes sensor 160 data and transmits it using modem 240 over network 190 to the central system 195. The data collection processor 210 is in communication with GPS 230. Data collection processor 210 processes GPS 230 data and transmits it using modem 240 over network 190 to central system 195. In some embodiments network 190 might not be present so sensor 160 and GPS 230 data may be stored in data store 220. And in some embodiments the sensor 160 data and GPS 230 data is both transmitted to the central system 195 and stored in data store 220. Data collection processor 210 also communicates with the driver control unit 140, supplying it with sensor 160 data, GPS 230 data, and other data needed by the driver. For instance, sensor 160 could be a tire pressure sensor and indicate that tire pressure is low. The driver, seeing that the tire pressure is low, can take corrective action. The vehicle operator my can also monitor the current tire pressure and historical tire pressure issues to determine to take the tire out of service, for instance.

Figure 3:
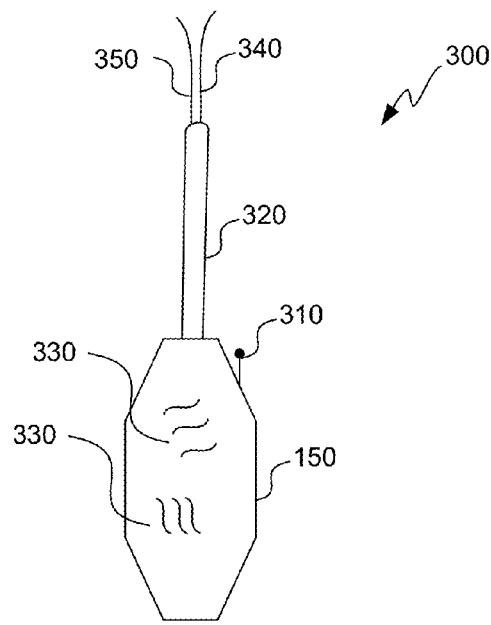
FIG. 3 is an illustrative view of a mounted data collection unit.
Figure 4:
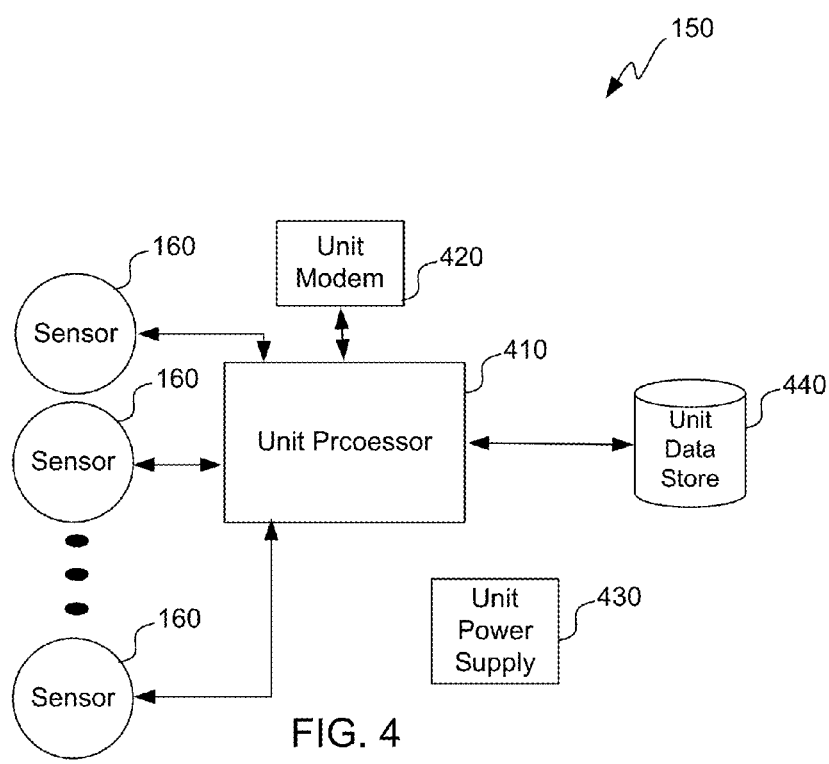
FIG. 4 is a block diagram of one embodiment of a data collection unit.

Looking now at FIG. 3, diagram 300 shows one embodiment of a data collection unit 150 mounted on a pole 320 that can hang from the ceiling of the bus 110. In other embodiments those of skill in the art will understand that the data collection unit 150 can be mounted on a pole extending from the floor of the bus 110—or mounted in any other way. One of skill in the art can appreciate that data collection unit 150 can be of any shape or size in other embodiments. Data collection unit 150 can house sensors 160 (not shown) that sense data through openings 330. These sensors can sense temperature, humidity, other atmospheric data, noise, odor, air contaminants, and any other data related to the human comfort of the bus 110. Data collection unit 150 can communicate sensor 160 data to the on-board data collector 105 using antenna 310 or, alternatively wired communication line 340. Data collection unit 150 can be battery operated (not shown) or can be powered by wired power line 350. Referring now to FIG. 4 that shows a block diagram of one embodiment of data collection unit 150. Unit Processor 410 collects sensor 160 data and transmits it to the data on-board data collector 105 using unit modem 420. Alternatively or in addition to, unit processor 410 sends data to a unit data store 440. Unit data store 440 can be any type of storage medium including a micro SD card, core memory, magnetic disk storage mediums, optical storage mediums, flash memory devices and/or other machine readable mediums for storing data. Unit power supply 430 supplies power to all data collection unit 150 components, including sensors 160, unit modem 420, unit processor 410, and unit data store 440. Unit power supply 430 can draw power from the wired power line 350, batteries, or from any know power source including wireless sources such as induction transfer as used in inductive electrical power transfer ("QI") charging technology.

Figure 5:
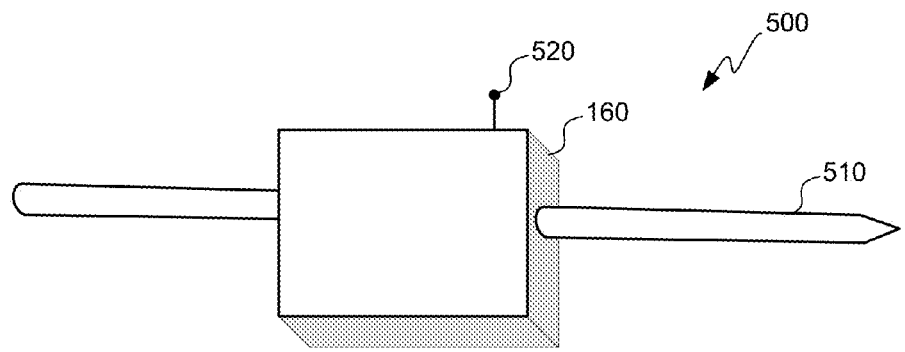
FIG. 5 is an illustrative view of a mounted sensor.

Looking next at FIG. 5 showing a diagram 500 of a sensor 160 mounted on system 510. In one embodiment, system 510 can be a pneumatic system on the vehicle under carriage and sensor 160 would sense or measure the vibration levels of the pneumatic system. In other embodiments system 510 can be the bus 110 motor, the bus 110 axle, the bus 110 tire, or any other external or internal element of bus 110. Sensor 160 can also have an antenna 520 to transmit sensor data. The antenna 520 can operate in a frequency or modulation technique appropriate including Bluetooth low energy. Now referring to the block diagram of one embodiment of the sensor 160 in FIG. 6, sensor 160 comprises a sensor processor 610, sensor modem 620, sensor power supply 630 and sensing mechanism 650. For instance, a temperature sensing mechanism would measure the voltage drop across a diode to determine temperature changes. Sensor power supply 630 can draw power from a wired power connection, batteries, or from any know power source including wireless sources such as induction transfer as used in QI charging technology. Possible sensor types utilized by embodiments include (but are not limited to) Accelerometer, Gyroscope, Vibration, Magnetic compass, GPS, Temperature, Bus Voltage, Pressure, Humidity, Light, UV light, Pyroelectric Detector, Sound pressure (with or without spectral analysis), airspeed, ultrasonic Doppler, $CO_2$, and/or CO sensors and other chemical sensors ($H_2S$, organic solvents, . . . ), smoke detectors. One of skill in the art will recognize that this is not an exhaustive list of all possible sensors—but other embodiments can use any type of sensor not listed here. On a bus or other transit vehicle, such sensors could be used for monitoring oil pressure, engine temperature, pneumatic or hydraulic pressure, odometer, etc. The on-board sensors can typically be so-called MEMS sensors that are cheap, small, and accurate. By combining the input from various sensors, the operation of the bus can be monitored or the comfort level for passengers can be determined. In the first case sensors such as vibration, sound and accelerometers can be used to detect the onset of mechanical failures (e.g., faulty transmission, brakes, or engine), driver behavior, and quality of the ride, for example. The collected data can be correlated with GPS position and/or dead reckoning to compensate for road condition. Such a system can also be used for monitoring street quality (e.g., pot-holes).

Figure 7:
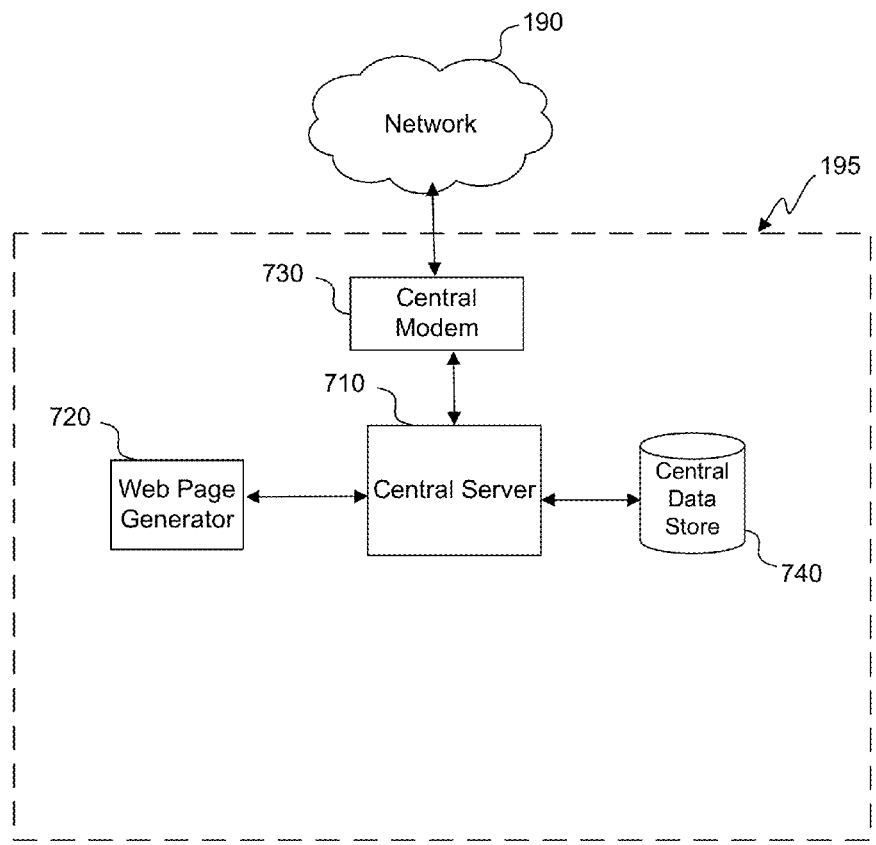
FIG. 7 is a block diagram of one embodiment of the central system.

With reference now to FIG. 7 that depicts a block diagram of a the central system 195. Central system 195 connects to the transit vehicle sensor system 100 using central modem 730 through the network 190. Central system 195 can have a central server 710 connected to a central data store 740. Central server 710 is also connected to web page generator 720. Web page generator 720 generates the web pages in response to user device 180 requests—such as a request for the comfort conditions and arrival time of a bus. Central server 710 extracts sensor 160 data related to the user device 180 request from central data store 740, transforms it into the data requested by user device 180 and sends it to the web page generator 720. For instance, the central server 710 can transform longitude and latitude coordinates into actual bus 110 stop names or addresses. In some embodiments central server 710 can transform raw sensor data into temperature readings. One of skill in the art will recognize that there are numerous transformations from various sensors that may be required based on a user device 180 request. Once the web page generator generates the web page—the central server 710 alerts the user device 180 that the web page is available using central modem 750 over the network 190. The alert my not be a traditional alert as in some embodiments the alert can simply be the central server 710 providing the direction (URL or other link) to the web page to the user device 180. The central system 710 can also send a text based message to the user device 180 with a link to the web page or with the desired information from the web page. And the central server 710 can also push information to the user device 180 in cases where the user device 180 has requested push notifications or purchased a fare with the device. On of skill in the art will recognize that data can be transmitted to user device 180 in many forms in other embodiments, including text, comma separated lines, and other forms of data representation.

In some embodiments, central server 710 can be used for determining the general environment (temperature+humidity+airspeed+sound pressure+$CO_2$+$H_2S$), detect unsafe (CO+smoke) or illegal events (organic solvents=graffiti), comfort level (acceleration+vibration+temperature+humidity+airspeed+sound pressure), driver behavior (acceleration), and so on. In some embodiments this system may be an artificial intelligence system, which may be capable of learning/adaptive functionality.

Figure 8:
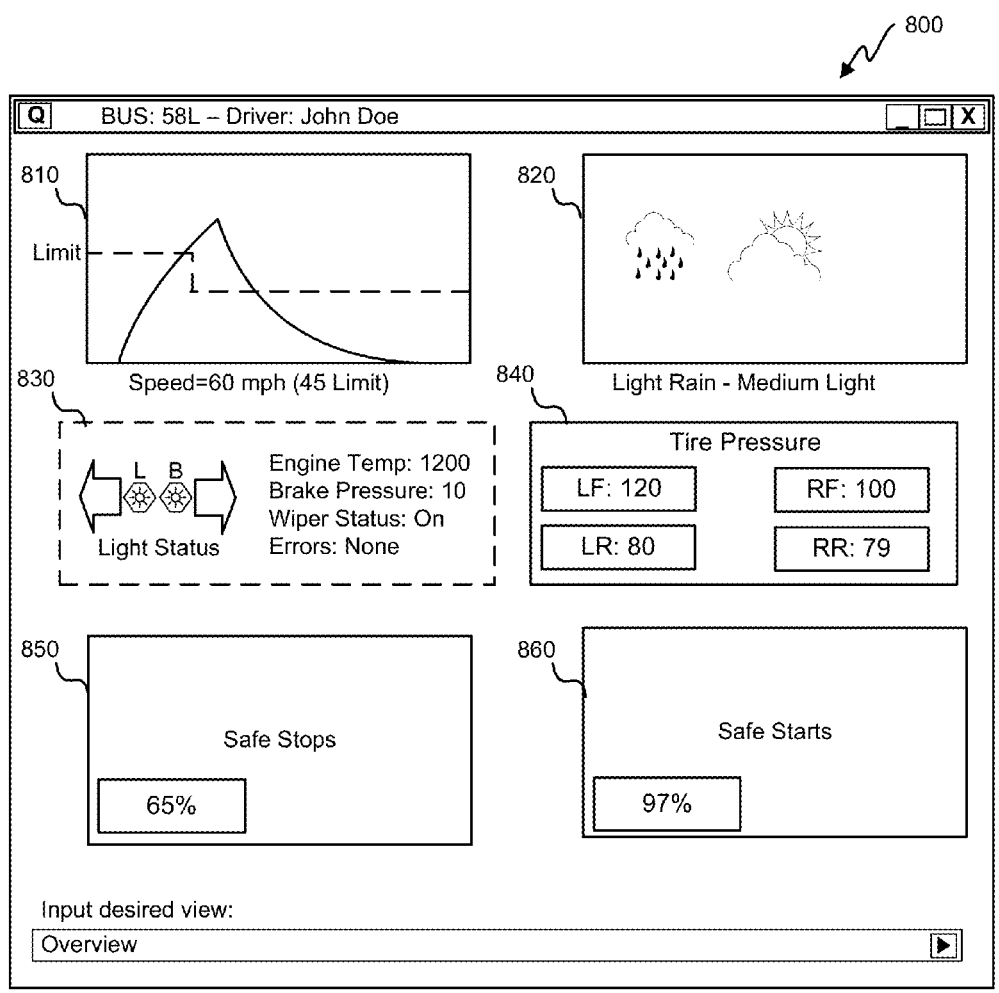
FIG. 8 is a screen shot showing vehicle and driver performance.
Figure 9:
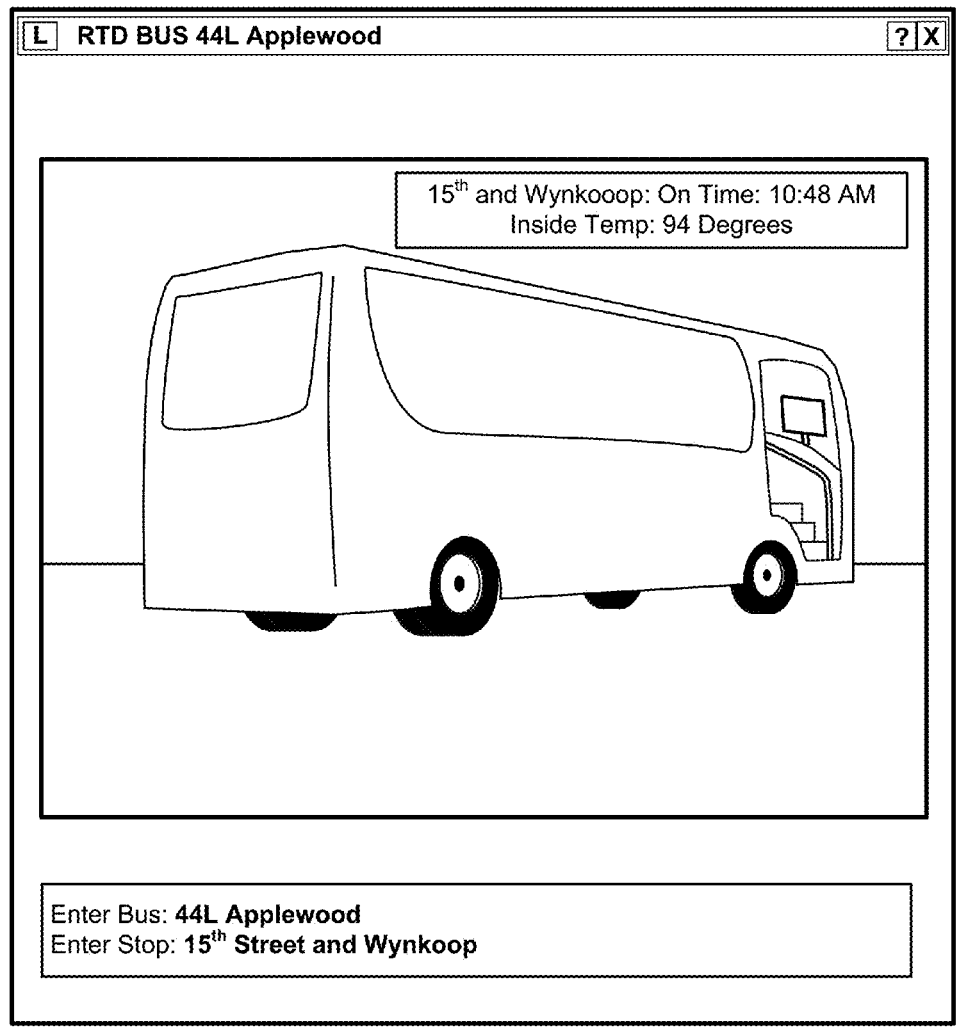
FIG. 9 is a screen shot showing user comfort information on a bus.
Figure 10A:
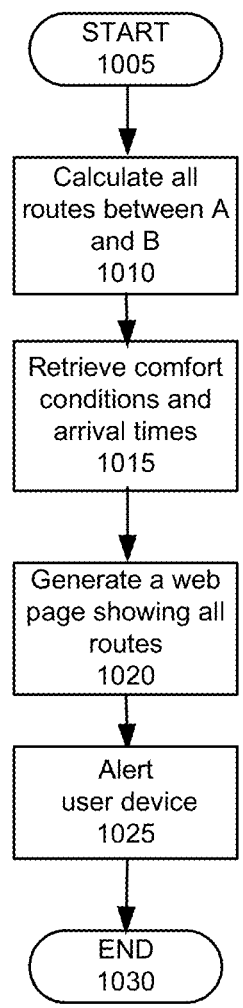
FIG. 10A is a flowchart depicting route schedules and bus comfort levels.
Figure 10B:
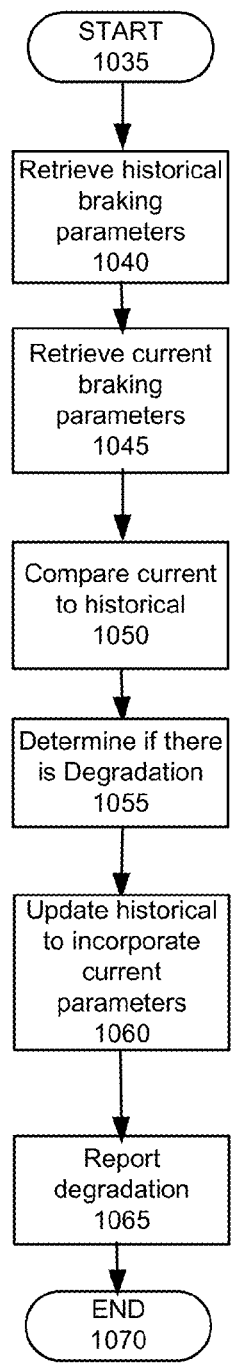
FIG. 10B is a flowchart depicting a process for collecting data on braking performance.

In response to a request by the bus 110 operator for information about the driver and status of bus 110, web page generator 720 can generate a web page as shown in FIG. 8. FIG. 8 depicts a web page view 800 of the overview of Bus 58L and driver Jon Doe. As shown at 810, John Doe is driving over the 45 mph speed limit at 60 mph. 820 shows that there is light rain but medium light conditions. At 830 the engine temperature, brake pressure and other indicators are shown. 840 depicts the tire pressure of all four tires, while 850 and 860 show safe stop and start statistics for the bus driver John Doe. The web page generator 720 can also generate a web page indicating conditions of a particular bus in response to a request by a user device 180 as shown in FIG. 9. In the web page shown in FIG. 9, the temperature is shown for bus 44L to Applewood. The arrival time at the bus stop at 15$^{th}$ Street and Wynkoop Street is also shown. Bus 44L will arrive on time at 10:48 AM, and it is 94 degrees inside bus 44L. The user of user device 180 may choose a different route between point A and point b if the user desires a more comfortable ride. In such a case the central system 195 can generate a web page showing routes with bus arrival times and comfort conditions and transmit it to the user device 180. FIG. 10A depicts a flow chart of this process. After starting at block 1005, the central server 710 calculates all routes between points A and point B at block 1010. The central server 710 retrieves from central data store 740 the comfort conditions and arrival times for the routes between point A and point B at block 1015. At block 1020 the web page generator 720 depicts the web page showing all routes, arrival times, and comfort levels. At block 1025 the central server 710 alerts the user device 180 over network 190 that the web page is available to view. The process is over at block 1030. One of skill in the art will recognize that central server 710 can retrieve from central data store 740 and process data that web page generator 720 can use to create many more web pages that can be presented to user device 180 including one showing an aggregation of road conditions for an area, driver performance on one or more buses, mechanical integrity of a bus, etc. One such is the degradation of performance of a part of the bus infrastructure—such as braking as shown in the flow chart depicted in FIG. 10B. After starting at block 1035—possible in response to bus 110 using the brakes—the central server 710 retrieves historical braking parameters, such as brake pad thickness and distance required for a full stop when fully braking, for the bus 110 in question from central data store 740 at the next block 1040. Then at block 1045 central server 710 retrieves the current braking parameters. At block 1050 the central server 710 compares the historical parameters to the current parameters. At block 1055 the central server 710 determines if the current brake pad thickness is less than the historical thickness and/or if the distance to full stop at fully braking is farther than the historical distance. Then at block 1060 the central server 710 updates the historical parameters by incorporating the current parameters. At block 1065 the degradation is reported to the bus 110 operator. In one embodiment the web page generator generates 720 a web page showing the parameters and the degradation and the central server 710 transmits the web page parameters to the bus 110 operator using the central modem 730 over network 190. At block 1070 the process ends. One of skill in the art can recognize that machine learning techniques can be applied to any number of parameters to create and update the historical parameter to determine performance.

Figure 10C:
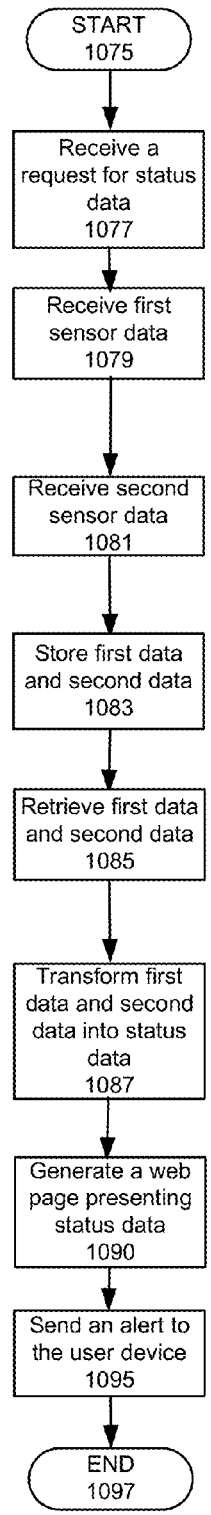
FIG. 10C is a flowchart depicting a method of collecting sensor data.

Now looking at FIG. 10C, a flowchart depicting, in one embodiment, the method of collecting transit vehicle sensor data. After starting at step 1075, the next step 1077 is the central system 195 receiving a request for status data from a user device 180. Status data is comprised of any vehicle parameters including temperature, humidity, and/or on-time status. At the next step, 1079, the central system 195 receives first sensor data followed by step 1081, receiving second sensor data. At the next step, 1083, first and second data are stored in a central data store 740 in central system 195. At step 1085, the central server 710 retrieves the first data and second data, and at step 1087, transforms first data and second data into status data. For instance, if the user device requested the temperature of the vehicle, the transformation could include turning the voltage drop of a diode on a temperature sensor to an actual temperature. At step 1090 the web page generator 720 generates a web page presenting status data. At step 1095 the central system 195 alerts the user device 180 that the web page presenting status data is available. The alert can include sending an internet address of the web page to the user device 180, a text message with the web page address, or any other method of alerting the device that the request for status data is ready. At step 1097 the method ends.

Figure 11:
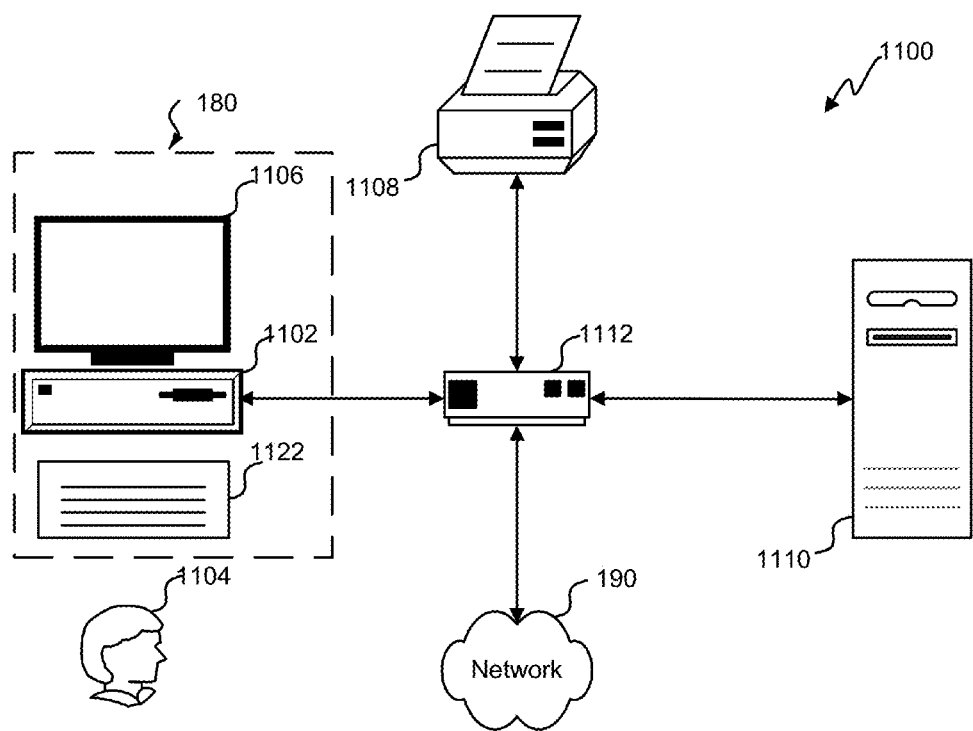
FIG. 11 depicts a block diagram of an embodiment of a user device.

With reference now to FIG. 11, an exemplary environment with which embodiments may be implemented is shown with a user device 180 that can be used by a user 1104 who is typically a transit patron, transit authority user, vehicle operator user, or other consumer of the transit vehicle sensor system 100. The computer system 1100 can include a computer 1102, keyboard 1122, a network router 1112, a printer 1108, and a monitor 1106. The monitor 1106, processor 1102 and keyboard 1122 can be incorporated into user device 180, that may be a smart phone or other mobile phone (including a near-field-communication enabled mobile phone), a tablet personal computer (PC), a personal digital assistant (PDA), an e-book reader, wearable device, or other computing device. The monitor 1106 can be external or built in and one of any type of technology such as a CRT, flat screen, etc.

A user 1104 can input commands into the computer 1102 using various input devices, such as a mouse, keyboard 1122, track ball, touch screen, voice command, etc. Additionally, the user device 180 may be connected to a printer 1108 and a server 1110 using a network router 1112 that may connect to the network 190 or other network.

The server 1110 may, for example, be used to store additional software programs and data. In one embodiment, software implementing the systems and methods described herein can be stored on a storage medium in the server 1110. Thus, the software can be run from the storage medium in the server 1110. In another embodiment, software implementing the systems and methods described herein can be stored on a storage medium in the computer 1102. Thus, the software can be run from the storage medium in the user device 180. Therefore, in this embodiment, the software can be used whether or not computer 1102 is connected to network router 1112. Printer 1108 may be connected directly to computer 1102, in which case, the user device 180 can print whether or not it is connected to network router 1112.

With reference to FIG. 12, an embodiment of a special-purpose computer system 1204 is shown. The above methods may be implemented by computer-program products that direct a computer system to perform the actions of the above-described methods and components. Each such computer-program product may comprise sets of instructions (code) embodied on a computer-readable medium that directs the processor of a computer system to perform corresponding actions. The instructions may be configured to run in sequential order, or in parallel (such as under different processing threads), or in a combination thereof. After loading the computer-program products on the central server 710, it is transformed into the special-purpose computer system 1204.

Special-purpose computer system 1204 comprises a computer 1202, a monitor 1206 coupled to computer 1202, one or more additional user output devices 1230 (optional) coupled to computer 1202, one or more user input devices 1240 (e.g., keyboard, mouse, track ball, touch screen) coupled to computer 1202, an optional communications interface 1250 coupled to computer 1202, a computer-program product 1205 stored in a tangible computer-readable memory in computer 1202. Computer-program product 1205 directs system 1204 to perform the above-described methods. Computer 1202 may include one or more processors 1260 that communicate with a number of peripheral devices via a bus subsystem 1290. These peripheral devices may include user output device(s) 1230, user input device(s) 1240, communications interface 1250, and a storage subsystem, such as random access memory (RAM) 1270 and non-volatile storage drive 1280 (e.g., disk drive, optical drive, solid state drive), which are forms of tangible computer-readable memory.

Computer-program product 1205 may be stored in non-volatile storage drive 1280 or another computer-readable medium accessible to computer 1202 and loaded into memory 1270. Each processor 1260 may comprise a microprocessor, such as a microprocessor from Intel® or Advanced Micro Devices, Inc.®, or the like. To support computer-program product 1205, the computer 1202 runs an operating system that handles the communications of product 1205 with the above-noted components, as well as the communications between the above-noted components in support of the computer-program product 1205. Exemplary operating systems include Windows® or the like from Microsoft® Corporation, Solaris® from Oracle®, LINUX, UNIX, and the like.

User input devices 1240 include all possible types of devices and mechanisms to input information to computer system 1202. These may include a keyboard, a keypad, a mouse, a scanner, a digital drawing pad, a touch screen incorporated into the display, audio input devices such as voice recognition systems, microphones, and other types of input devices. In various embodiments, user input devices 1240 are typically embodied as a computer mouse, a trackball, a track pad, a joystick, wireless remote, a drawing tablet, a voice command system. User input devices 1240 typically allow a user to select objects, icons, text and the like that appear on the monitor 1206 via a command or a click of a button or the like. User output devices 1230 include all possible types of devices and mechanisms to output information from computer 1202. These may include a display (e.g., monitor 1206), printers, non-visual displays such as audio output devices, etc.

Communications interface 1250 provides an interface to other communication networks 1295 and devices and may serve as an interface to receive data from and transmit data to other systems, wide area network s and/or the network 190. Embodiments of communications interface 1250 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1250 may be coupled to a computer network, to a FireWire® bus, or the like. In other embodiments, communications interface 1250 may be physically integrated on the motherboard of computer 1102, and/or may be a software program, or the like.

RAM 1270 and non-volatile storage drive 1280 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1270 and non-volatile storage drive 1280 may be configured to store the basic programming and data constructs that provide the functionality of various embodiments of the present invention, as described above.

Software instruction sets that provide the functionality of the present invention may be stored in RAM 1270 and non-volatile storage drive 1280. These instruction sets or code may be executed by the processor(s) 1260. RAM 1270 and non-volatile storage drive 1280 may also provide a repository to store data and data structures used in accordance with the present invention. RAM 1270 and non-volatile storage drive 1280 may include a number of memories including a main random access memory (RAM) to store of instructions and data during program execution and a read-only memory (ROM) in which fixed instructions are stored. RAM 1270 and non-volatile storage drive 1280 may include a file storage subsystem providing persistent (non-volatile) storage of program and/or data files. RAM 1270 and non-volatile storage drive 1280 may also include removable storage systems, such as removable flash memory.

Bus subsystem 1290 provides a mechanism to allow the various components and subsystems of computer 1202 communicate with each other as intended. Although bus subsystem 1290 is shown schematically as a single bus, alternative embodiments of the bus subsystem may utilize multiple busses or communication paths within the computer 1202.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments. It is also the case that modules, software, or algorithms can be performed on one server, multiple servers or share the same server. A platform is a major piece of software, such as an operating system, an operating environment, or a relational database or data store, under with various smaller application programs can be designed to run. An operating system is the most important software program running on most computer systems. It manages a processors memory, processes, all of the software and programs loaded onto it, and all of the connected hardware. The operating system's job is to manage all of the software and hardware on the computer. Most of the time, there are many different software programs operating at once as well as multiple connected hardware devices. There are many operating systems—the most basic is the disk operating system or "DOS." Each type of computer or device typically has its own different operating systems. Some typical operating systems are iOS, Windows, Android, and Linux.

The networks disclosed may be implemented in any number of topologies. A network is made of many computing devices that can include computers, servers, mainframe computers, network devices, peripherals, or other devise connected together. A network allows these devices to share data and communicate with each other. The most prominent network is the Internet—that connects billions of devices all over the world. There are many types of network devices including: computers, consoles, firewalls, hubs, routers, smartphones, switches, wearables, watches, and cameras. Networks are set up in many different ways referred to as network topologies. Some of the most common topologies include tree, hybrid, ring, mesh star, and bus. The tree topology is the generally used topology. A computer is typically an electronic device for storing and processing data according to instruction it reads. A console is a text entry and display device. A firewall is network security system, either hardware- or software-based, that controls incoming and outgoing network traffic based on a set of rules, and acts as a barrier between a trusted network and other untrusted networks—such as the Internet—or less-trusted networks—a firewall controls access to the resources of a network through a positive control model. This means that the only traffic allowed onto the network defined in the firewall policy is; all other traffic is denied. A hub is a connection point for multiple devices in a network. A hub typically has multiple ports such that if packets of data arrive at one port they are copied to the other ports. A router is a device that forwards data packets along the network. A router connects two or more networks such as an intranet to the internet. Routers use headers and forwarding tables to determine how data packets should be sent using certain paths in the network. The typical router protocol using ICMP to communicate and configure the best path. A network switch is different from a router. Switches serve as controllers that enable networked devices to communicate with each other. Switches create networks while routers connect networks together.

Networks operate on the seven layer open system interconnection (OSI) model. The OSI model defines a conceptual networking framework to implement protocols and divides the task of networking into a vertical stack of the seven layers. In the OSI model, communication control is passed through the layers from the first to the seventh layer. The first or "top" layer is the "physical" layer. Layer 1 transmits the bit stream of ones and zeros indicated by electrical impulse, light, or radio frequency signals—thus providing a method of interacting with actual hardware in a meaningful way. Examples of the physical layer include Ethernet, FDDI, B8ZS, V.35, V.24, and RJ45. The second layer is called the Data Link layer. At layer 2 data packets are encoded and decoded into a bit stream in compliance with transmission protocols that control flow control and frame synchronization. The Data Link layer 2 is actually a combination of two different layers: the Media Access Control (MAC) layer and the Logical Link Control (LLC) layer. The MAC layer controls a computer's access to the network. The LLC basically controls frame synchronization, flow control, and various types of error correction. Examples of the Data Link layer include PPP, FDDI, ATM, IEEE 802.5/802.2, IEEE 802.3/802.2, HDLC, and Frame Relay. The third OSI layer, called the "Network" layer, provides the switching and routing technology to create logical paths to transmit data from one node to another in the network. Layer. The Network layer also performs the function of routing, forwarding, addressing, internetworking, error handling, congestion control, and packet sequencing. Layer 3 examples include AppleTalk, DDP, IP, and IPX. The fourth OSI layer is the Transport layer. Layer 4 provides transparent transfer of data between devices. Layer 4 also performs error recovery and provides flow control for complete data transfer. Examples of layer 4 include SPX, TCP, and UDP. OSI layer 5 called the Session layer because it manages and terminates the connections between different applications. The Session layer coordinates communication between applications. It sets up communications and terminates the communications between applications at each end—establishing and ending a "session." Examples include NFS, NetBios, names, RPC, and SQL. Layer 6 is called the Presentation Layer. Layer 6 is really the "transformation" layer—transforming data from the final layer to a format the network understands and vice versa. Layer 6 formats and encrypts data sent on the network and decrypts the data from the network. Examples include ASCII, EBCDIC, TIFF, GIF, PICT, JPEG, MPEG, and MIDI. Finally, the last layer 7, is called the Application Layer. Everything at this layer is specific to applications, and this layer provides the services for email, file transfers, and other network applications. Examples include WWW browsers, NFS, SNMP, FTP, Telnet, and HTTP.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), complex instruction set computers (CISCs), reduced instruction set computers (RISCs), advanced RISC machines (ARMs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof. A processor is implemented in logic circuitry that includes the basic functions of AND, NAND, OR, and NOR functions. The circuitry responds to the basic instructions that operate an computing device. In some computing devices the processor is actually referred to a as microprocessor. Functionally, processors are typically composed of RAM as well as address and data buses, the processing circuitry and accumulators. The busses supply the data and programming instructions from RAM, ROM, CACHE, or other memory to the processing circuitry. The speed of a processor depends both on the speed of the processing circuitry as well as the speed of the data and address busses that supply the circuitry. And the speed of the data and address buses are also gated by the speed of the RAM. It is critical that all of these components have speeds that are matched to one another to maximize processor performance. Processors use machine level instruction codes to manipulate data. Other instructions must be compiled to machine level instructions to for the processor to perform the operations. Dual core processors have dual processing circuitry and multiple address and data buses.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing data. The term "machine-readable medium" includes, but is not limited to portable or fixed storage devices, optical storage devices, and/or various other storage mediums capable of storing that contain or carry instruction(s) and/or data. Cache memory, also called the central processing unit (CPU) memory, is random access memory that the processor can access more quickly than standard RAM. Cache memory is typically integrated into the circuitry with the processing unit, but sometimes can be placed on a separate chip. The principle purpose of cache memory is to store the program instruction for the operational software such as an operating systems. Most long running software instructions reside in cache memory if they are accessed often.

While the principles of the disclosure have been described above in connection with specific apparatuses and methods, it is to be clearly understood that this description is made only by way of example and not as limitation on the scope of the disclosure.

What is claimed is:

1. A method of data collection from sensors on a transit vehicle, the method comprising:
providing a central system, wherein:
the central system is geographically separated from the transit vehicle;
the central system is connected to a data store;
the data store is geographically separated from the transit vehicle;
the central system is connected to the transit vehicle by a network;
the central system is connected to a passenger device by the network, wherein:
a user of the passenger device will travel on the transit vehicle; and
the passenger device is geographically separated from the central system;
receiving a request by the central system, from the passenger device, wherein:
the request is for a presentation of status data; and
the status data comprises two or more sensor measurement results of the transit vehicle, measured as of the time of the request;
receiving by the central system, in response to the request:
first data, from a first sensor connected to the transit vehicle, wherein the first sensor senses a first one of: odor, temperature, humidity, motion, or any other factor, in the interior of the transit vehicle; and
second data, from a second sensor connected to the transit vehicle, wherein the second sensor senses a second one of: odor, temperature, humidity, motion, or any other factor, of the transit vehicle;
in response to the request for the presentation of status data:
storing the first data and the second data at the data store;
transforming, by the central system, the first data and the second data into status data;
generating, by the central system, a web page, wherein the web page presents status data; and
sending, by the central system, an alert to the passenger device indicating that the status data is available, such that the user of the passenger device can access the status data using the passenger device.

2. The method of data collection on a transit vehicle of claim 1, wherein the second sensor is mounted inside the vehicle.

3. The method of data collection on a transit vehicle of claim 1, wherein the second sensor is mounted externally on the vehicle.

4. The method of data collection on a transit vehicle of claim 3, wherein the second sensor senses one or more road conditions.

5. The method of data collection on a transit vehicle of claim 1, further comprising a data collection unit, and wherein:
the first sensor is enclosed in the data collection unit; and
the central system receives first sensor data from the data collection unit.

6. The method of data collection on a transit vehicle of claim 1, further comprising a third sensor, wherein the third sensor senses tire, oil, fluid, pneumatic, and/or hydraulic pressure.

7. The method of data collection on a transit vehicle of claim 6, wherein the third sensor further senses one or more road conditions.

8. A transit vehicle sensor data collection device comprising:
a central system, wherein:
the central system is geographically separated from the transit vehicle;
the central system is connected to a data store;
the data store is geographically separated from the transit vehicle;
the central system is connected to the transit vehicle by a network;
the central system is connected to a passenger device by the network, wherein:
a user of the passenger device will travel on the transit vehicle; and
the passenger device is geographically separated from the central system; and the central system receives a request from the passenger device, wherein:
the request is for a presentation of status data,
the status data is related to two or more sensor measurement results of the transit vehicle, measured as of the time of the request;
the central system receives, in response to the request:
first data, from a first sensor connected to the transit vehicle, wherein the first sensor senses a first one of: odor, temperature, humidity, motion, or any other factor, in the interior of the transit vehicle; and
second data, from a second sensor connected to the transit vehicle, wherein the second sensor senses a second one of: odor, temperature, humidity, motion, or any other factor, of the transit vehicle;
the central system, in response to the request, is configured to;
store the first data and the second data at the data store;
transform the first data and the second data into status data;
generate a web page, wherein the web page presents status data; and
send an alert to the passenger device indicating that the status data is available, such that the user of the passenger device can access the status data using the passenger device.

9. The transit vehicle sensor data collection device of claim 8, wherein the second sensor is mounted inside the vehicle.

10. The transit vehicle sensor data collection device of claim 8, wherein the second sensor is mounted externally on the vehicle.

11. The transit vehicle sensor data collection device of claim 10, wherein the second sensor senses one or more road conditions.

12. The transit vehicle sensor data collection device of claim 8, further comprising a data collection unit, and wherein:
the first sensor is enclosed in the data collection unit; and
the central system receives first sensor data from the data collection unit.

13. The transit vehicle sensor data collection device of claim 8, further comprising a third sensor, wherein the third sensor senses tire, oil, fluid, pneumatic, and/or hydraulic pressure.

14. The transit vehicle sensor data collection device of claim 13, wherein the third sensor further senses one or more road conditions.

15. A non-transitory computer readable medium having instructions embedded thereon for collecting transit vehicle sensor data the instructions including computer code for:
operating a central system, wherein:
the central system is geographically separated from the transit vehicle;
the central system is connected to a data store;
the data store is geographically separated from the transit vehicle;
the central system is connected to the transit vehicle by a network;
the central system is connected to a passenger device by the network, wherein:
a user of the passenger device will travel on the transit vehicle; and
the passenger device is geographically separated from the central system;
receiving a request by the central system, from the passenger device, wherein:
the request is for a presentation of status data; and
the status data comprises two or more sensor measurement results of the transit vehicle, measured as of the time of the request;
receiving by the central system, in response to the request:
first data, from a first sensor connected to the transit vehicle, wherein the first sensor senses a first one of: odor, temperature, humidity, motion, or any other factor, in the interior of the transit vehicle; and
second data, from a second sensor connected to the transit vehicle, wherein the second sensor senses a second one of: odor, temperature, humidity, motion, or any other factor, of the transit vehicle;
in response to the request for the presentation of status data:
storing the first data and the second data at the data store
transforming, by the central system, the first data and the second data into status data;
generating, by the central system, a web page, wherein the web page presents status data; and
sending by the central system; an alert to the passenger device indicating that the status data is available, such that the user of the passenger device can access the status data using the passenger device.

16. The non-transitory computer readable medium having instructions embedded thereon for collecting transit vehicle sensor data of claim 15, wherein the second sensor is mounted inside the vehicle.

17. The non-transitory computer readable medium having instructions embedded thereon for collecting transit vehicle sensor data of claim 15, wherein the second sensor is mounted externally on the vehicle.

18. The non-transitory computer readable medium having instructions embedded thereon for collecting transit vehicle sensor data of claim 17, wherein the second sensor further senses one or more road conditions.

19. The non-transitory computer readable medium having instructions embedded thereon for collecting transit vehicle sensor data of claim 15, further comprising a data collection unit, and wherein:
the first sensor is enclosed in the data collection unit; and
the central system receives first data from the data collection unit.

20. The non-transitory computer readable medium having instructions embedded thereon for collecting transit vehicle sensor data of claim 17, wherein the second further sensor senses tire, oil, fluid, pneumatic, and/or hydraulic pressure.

* * * * *